RE 25405

SKEW ELIMINATION SYSTEM

Filed June 30, 1958

INVENTORS
VICTOR R. WITT
BY PETER I. PRENTKY
ERWIN K. DUDEK
ATTORNEY

Jan. 31, 1961 V. R. WITT ET AL 2,970,300

SKEW ELIMINATION SYSTEM

Filed June 30, 1958 4 Sheets-Sheet 3

United States Patent Office 2,970,300
Patented Jan. 31, 1961

2,970,300

SKEW ELIMINATION SYSTEM

Victor R. Witt, Poughkeepsie, Peter I. Prentky, Wappingers Falls, and Erwin K. Dudek, Poughkeepsie, N.Y., assignors to International Business Machines Corporation, New York, N.Y., a corporation of New York Filed June 30, 1958, Ser. No. 745,677

7 Claims. (Cl. 340—174.1)

This invention relates to a skew control system, and more particularly to a system for reading high density records on magnetic tape in which the problem of skew is encountered in an aggravated form.

Ideally, the bits representing magnetically recorded characters should be disposed on the record tape in a line perpendicular to the length of the tape, and, upon the reading of the tape, such bits should be read simultaneously. It is known, however, that the stated ideal cannot be achieved because of misalignment between the read-write heads and the tape during the recording and reproducing operations. Other factors, such as variation in tape speed, as well as electrical skew, contribute to the disposition of bits upon tape and the reading thereof in a somewhat serial order in respect to the several transversely recorded characters. The phenomenon known as "skew" may be defined as the difference in time measured between several read-back bits of a character. The total skew is the sum of the skew created when writing a character on tape and the skew created when reading the same character from tape.

Magnetic tape having low density recording thereon, i.e., 500 bits per inch or less, can be easily read, despite skew, with relatively simple reading and input equipment. Accordingly, it has been customary to read the bits of a character into an input register, one character at a time, while the bit positions of the register are held open sufficiently long to permit the storage of an entire character despite the somewhat serial arrival of the bits constituting the character. When all the skewed bits of a character are received in an input register, as stated, it is a relatively simple matter to simultaneously transfer the bits of a character from the input register to a line register or to other receiving equipment of a computer or data processing system.

Tapes having recording density of more than 5000 bits per inch in a large number of parallel tracks on tape, are now visualized. At a recording density of 1000 bits per inch or more, the problem presented by skew becomes more troublesome such that conventional data input equipment is no longer adequate to the problem.

It is, therefore, the broad objective of this invention to provide a tape reading and input system which is capable of accurately reading and receiving data recorded on magnetic tape at high density.

Regardless of the amount of skew encountered in reading a tape, the information that is recorded can be recovered if the incoming information is organized so that it can be recognized. Accordingly, the present invention provides means whereby a high density recording can be read from tape and the bits of each character are rendered intelligible to the system equipment.

Broadly stated, the invention contemplates a plurality of multi-bit registers for each longitudinal tape channel, so arranged that a plurality of characters are read into alternate or successive registers in which such characters are available for alternate or successive read-out; dynamic read-in of skewed data proceeding as to empty registers as data, in its static condition, is simultaneously read from a previously filled register or registers.

The specific aspects of the invention will be readily understood by reference to the following description, which is to be read in light of the drawings forming a part hereof, which drawings illustrate exemplary embodiments of of the invention, and in which.

In known deskewing methods, a character gate of fixed length is started by the arrival of the first bit of a character. In the high density record system envisioned herein, the bit period is much smaller than the total skew and the character gate method is, therefore, not feasible. This invention takes advantage of the concept that a synchronizing bit may be recorded on the tape such that when it is read, it will start a multivibrator which times the reading of the information bits that follow. In the exemplary embodiments which are shown herein for purpose of illustration, the registers have four positions and this implies that each fifth bit recorded on the tape will be a synchronizing bit. The synchronizing bit interval suggested herein is for the purpose of illustration only; it being apparent that such bits can be recorded at any selected interval consistent with the performance of the system.

Figure 1:
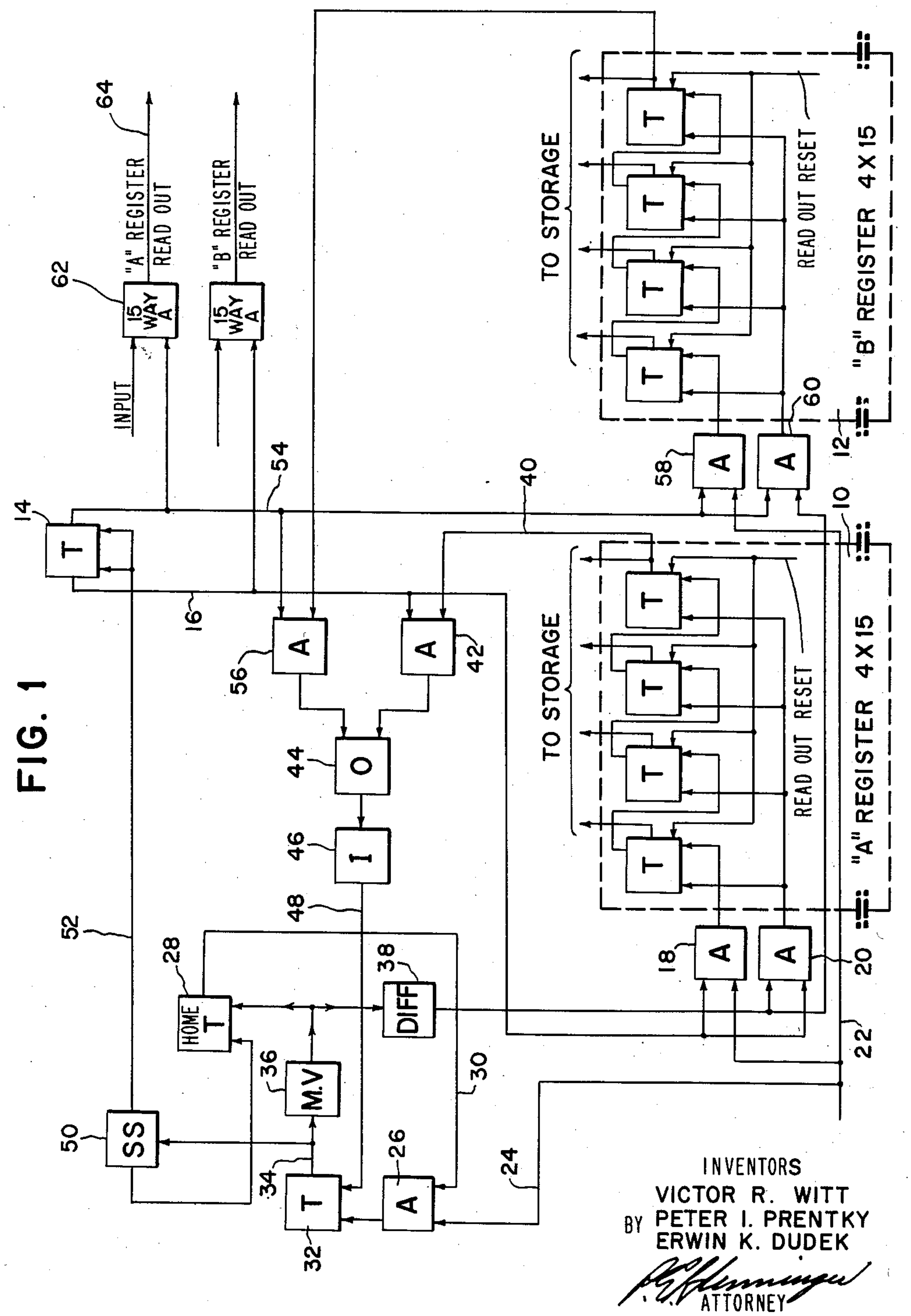
Fig. 1 is a block diagram of one embodiment of the invention in which a pair of input registers are employed.
Figure 3:
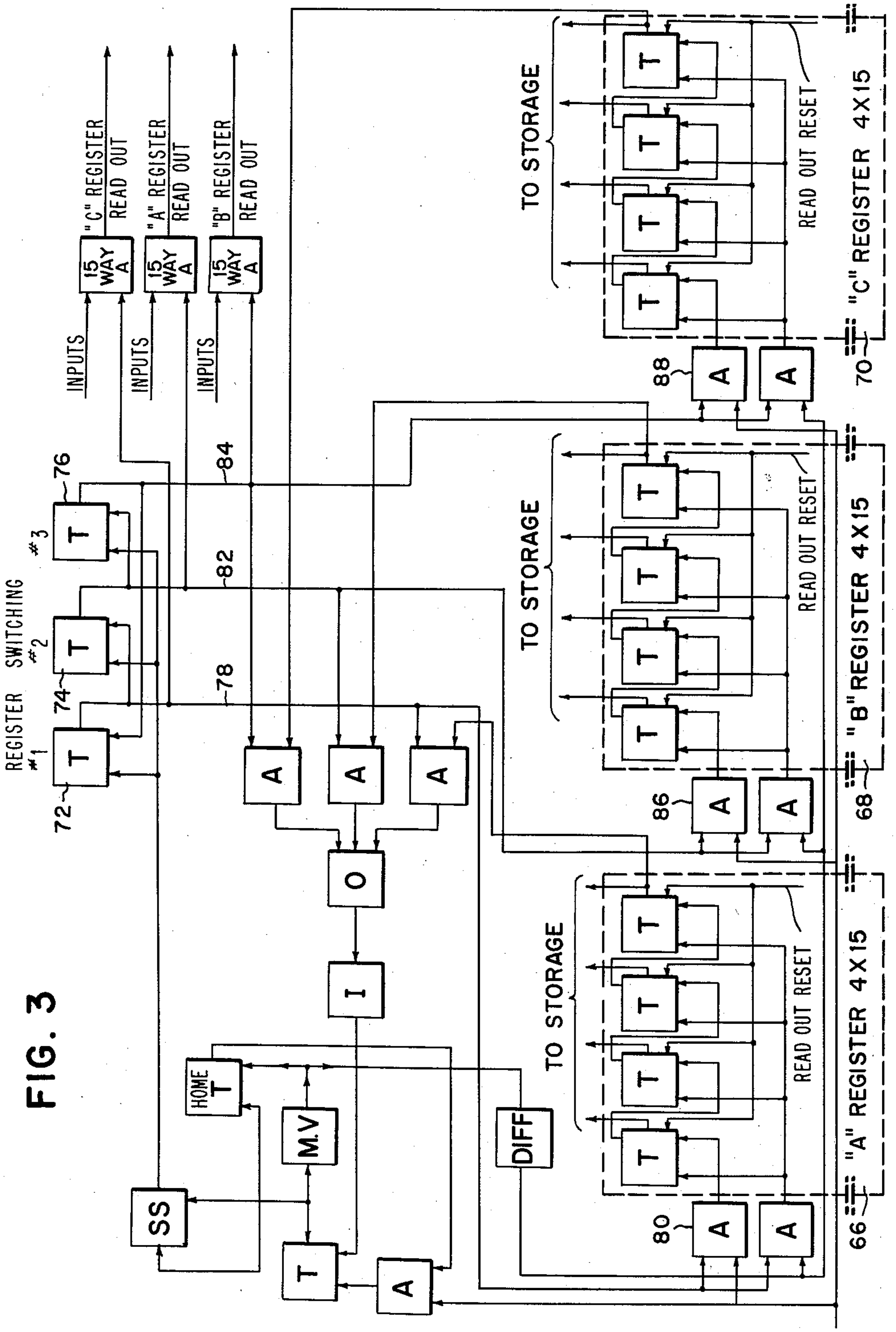
Fig. 3 is a block diagram of a second embodiment of the invention in which three input registers are employed.
Figure 4:
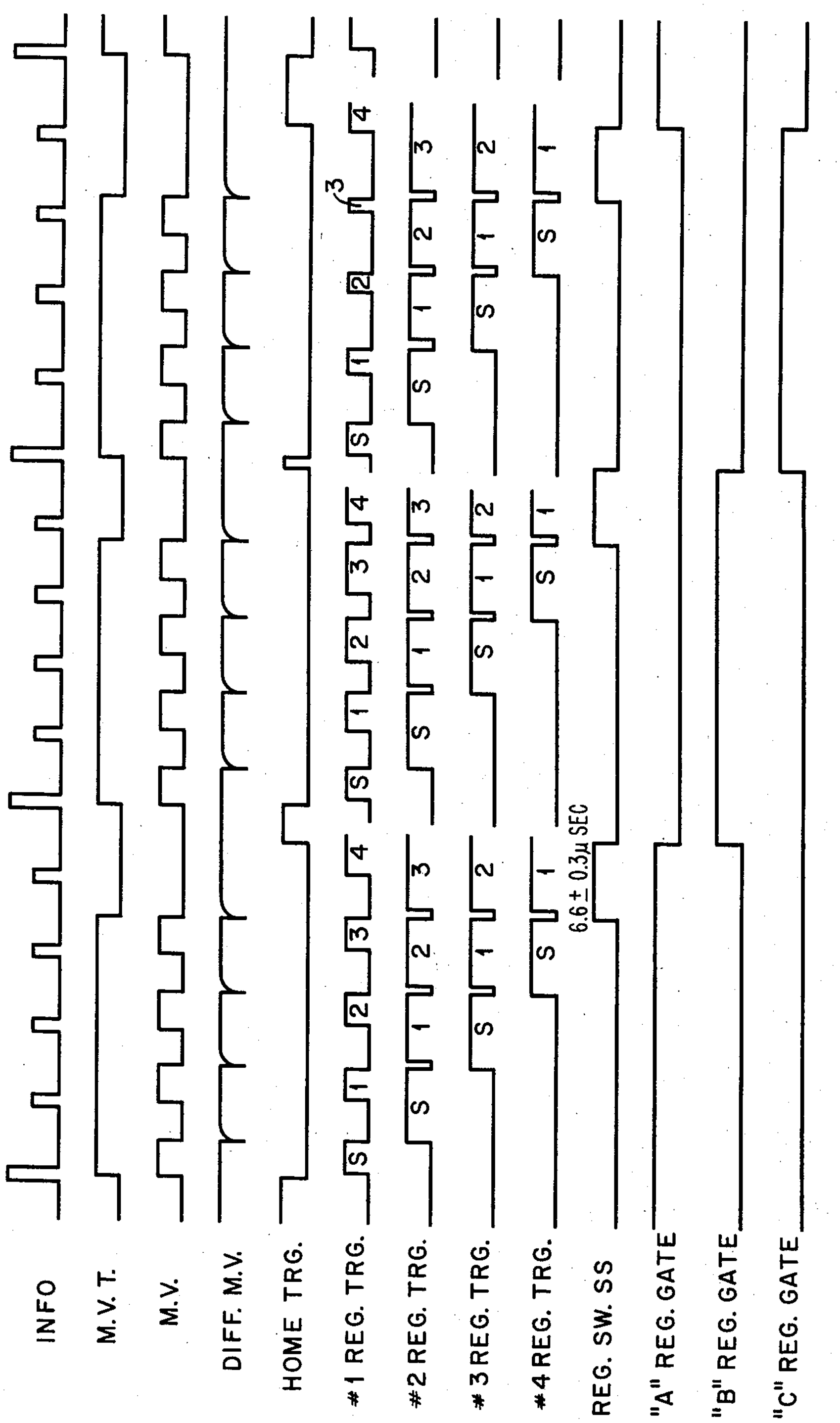
Fig. 4 is a timing diagram relating to the various components of Fig. 3.

As shown in Figs. 1 and 3, groups of four information bits are read into alternate buffers of the shift register type and when the appropriate buffers for all tracks are filled, they are read out to the system circuits such as, for example, a line register. The read out of buffers, as shown herein, is simultaneous as to each of the four positions. It is evident, however, that a serial read-out can be employed as would result from the use of a stepping register or that a stepping read-out pulse may be applied successively to the various positions of the register shown herein.

The circuits of Figs. 1 and 3 represent alternate forms of the invention as it is applied to a single reading channel. In pursuing the following description, therefore, it must be kept in mind that these circuits would be duplicated for each of the channels of tape being read. For the present, it may be assumed that the registers will include a sufficient number of storage positions to read and store data from 15-tape channels. As shown in Fig. 1, there are two registers each having 4 x 15 storage capacity; these registers being used alternatively for read-in and read-out. Fig. 3 discloses an enlargement of the concept in which three 4 x 15 registers are employed; these registers being read into and out of in sequential order.

Register switching means are provided for switching the information pulses from one register to the other when the one register being read into is filled. In Fig. 1, for example, which shows a pair of registers associated with an input track when register A is filled, the track output is switched to register B. At the same time that information is being read into the register B, the register A can be read out. The circuits are so designed that all of the storage positions of register A must be filled before read-out of the register is initiated. As each register B is filled, the track output is switched back to its associated register A while register B is being read out. The process is repetitive such that input information is alternated between the two or more registers.

Thus, information can be read into registers at slightly different times and can be read out of the registers simultaneously. The system of Fig. 3 is essentially the same as that shown in Fig. 1, with the exception that three buffers are employed, as stated, and that the necessary additional switching equipment has been added to accommodate the third register.

In Fig. 1, the bistable electronic triggers, of which registers 10 and 12 are composed, are initially set to their Off position wherein the right side of each is conducting. The register switch trigger 14 controls the read-in of information into the registers 10 and 12. The register switch trigger is also set to conduct initially on its right side such that the potential on its output line 16 is high. The output line 16 constitutes one input to a pair of two-way AND circuits 18 and 20 which are conditioned, therefore, by the positive pulse from the register switch trigger 14. When the first synchronizing pulse is transmitted along an input line 22, it is impressed on the AND circuit 18 whose output now turns On the first trigger of the register 10.

The same synchronizing pulse is transmitted by way of a connection 24 to an AND circuit 26. A trigger 28, normally conducting on its left side, has a high potential output on its right side which is transmitted by way of a connnection 30 to constitute the second input to the AND circuit 26. Because the trigger 28 conditions the AND circuit 26, the synchronizing pulse on the connection 24 will be transmitted through the AND circuit 26 and will turn On a trigger 32. When the trigger 32 is turned On, such that it conducts on its left side, the potential on its output line 34 is high and this will set into operation a multivibrator 36.

The first positive shift of the multivibrator 36 will turn Off the trigger 28 and this results in the deconditioning of the AND circuit 26 such that the character pulses which follow the synchronizing pulses will not pass through the AND circuit 26. The read-in control circuit is thereby isolated from the effect of character pulses which are being read into the register and, in effect, thereby is responsive solely to the synchronizing pulses.

Figure 2:
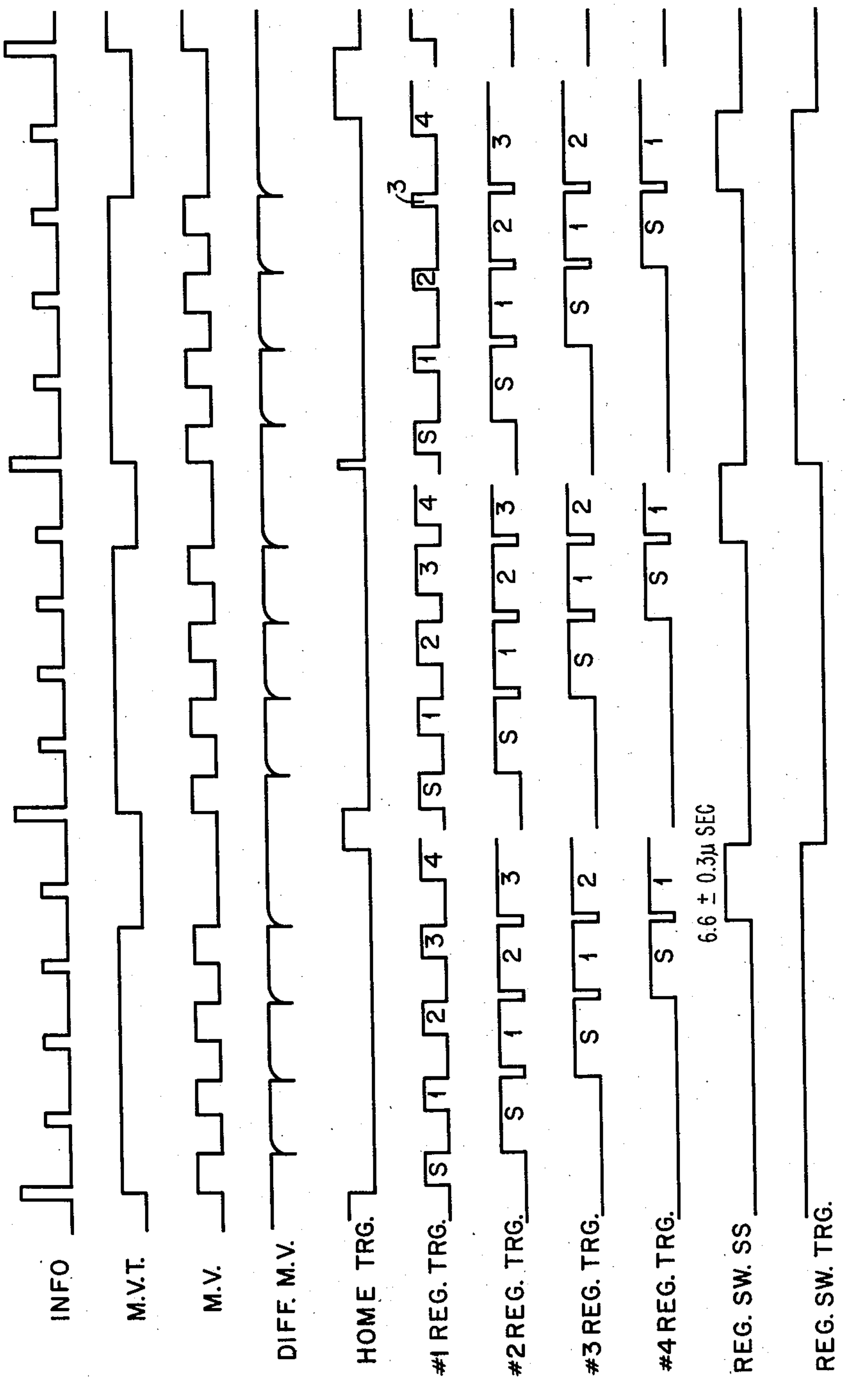
Fig. 2 is a timing diagram relating to the various components of Fig. 1.

The AND circuit 20, as previously stated, is conditioned by that output of the register switch trigger 14 which is transmitted through the connection 16. The output of the multivibrator 36 is also connected to the AND circuit 20 by way of a differentiating circuit 38. The first negative shift of the multivibrator 36 will be differentiated by the differentiating circuit 38 to produce a sharp negative pulse, as shown in the fourth line in Fig. 2. This momentary negative pulse will block the AND circuit 20 such that a sharp negative pulse will be transmitted to all of the triggers in the register 10. It will be recalled that at this instant only the first trigger of register 10 is turned On. Upon arrival of the negative pulse from the AND circuit 20, the first trigger of the register will, therefore, be turned Off. This results in the emission of a negative pulse from said trigger which is connected to the next following trigger of the register such that the second trigger of the register 10 will be turned On. In this manner, the synchronizing pulse is shifted to the second trigger of register 10.

The registers 10 and 12, as stated, are shifting registers in which the bits of information entered into the first trigger stage are sequentially shifted to the next higher register position as succeeding bits arrive at the first register position. Registers of this kind are well known in the art and need, therefore, not be described in detail. For a discussion of the nature and function of shifting registers, attention is called to pages 144 et seq. of "Arithmetic Operations in Digital Computers," by R. K. Richards, published by D. Van Nostrand Company, Inc., 1955.

If the first bit of information that is received on the input line 22 is a 1, the pulse representative thereof will pass through the AND circuit 18 and will be effective to turn On the first trigger of register 10. If the first bit of information read from tape, however, is a 0, no pulse will be present and the first trigger of register 10 will not be turned On. The foregoing statement implies the use of the well known non-return to zero method of magnetic recording, wherein 1's are represented by a change in the flux level of the record, and 0's are represented by no change in the flux level. It is patent, however, that the principles of the invention can be readily adapted to systems employing other magnetic recording methods such, for example, where a 1 is represented on tape by a high concentration of flux, and a 0 is represented by a concentration less than the norm.

The read-in of information into the register 10, as described, will be repeated for the second and third information bits at which time the synchronizing bit will be in the fourth position of the register and the first three information bits will be respectively in the third, second and first positions of the register. At a time midway between the third and fourth information bits, the multivibrator 36 will produce is fourth negative shift which is differentiated and applied in the usual manner to the AND circuit 20 and is thus effective to shift the synchronizing bit out of the fourth position register 10. At the same time, the first three information bits are shifting respectively into the fourth, third and second positions of the register. When the synchronizing bit is carried from the last position of the register, the fourth trigger of the register is turned Off thus producing a negative shift on a line 40 which is connected to an AND circuit 42. By reference to Fig. 1, it will be seen that the output of the register switch trigger 14 along line 16 is also an input to the AND circuit 42. The negative shift on line 40, therefore, blocks the AND circuit 42 such that the output through an OR circuit 44 will be low when the AND circuit 42 is blocked. The low output of the OR circuit 44 is passed into an inverter 46 thus producing a positive shift on an output line 48 of the inverter. The positive pulse on the line 48 is an input to the trigger 32 and effectively turns Off said trigger. When the trigger 32 is turned Off, a negative shift produced on the line 34 will turn Off the multivibrator 36 and at the same time will turn On a single shot multivibrator 50 so that the last information pulse can be gated into the register. When the single shot multivibrator 50 is turned On, the potential of its output line 52 will be high. During the time that the single shot multivibrator 50 is On, the fourth information bit is entered into the first position of the register 10.

When the single shot multivibrator 50 goes Off, its output line 52 will be at a low potential such that the negative shift thereof, transmitted to the trigger 14, will switch the register switch trigger 14 to its opposite status. When the status of the trigger 14 is reversed, its ouput line 16 will be at low potential thereby blocking AND circuits 42, 18 and 20. At the same time, the output at the right of the register switch trigger 14 will be high such that the potential on its output line 54 will be high. By reference to Fig. 1, it will be seen that the potential on the output line 54 constitutes an input to AND circuits 56, 58 and 60.

When the line 54 has thereon a high potential due to the reversal of the register switch trigger 14, it is an indication to a fifteen-way AND circuit 62 that register 10 for its associated track is filled. It is to be noted, however, that the AND circuit 62 has inputs which are connected to triggers similar to the switch trigger 14 but associated with other tracks and other positions of the register 10. Therefore, when all of the positions of register 10 are filled, a positive shift will be sensed on an output 64 of the AND circuit 62, and this output can be transmitted to the register as a Read-Out Reset signal which will serve to reverse the status of the register triggers and thereby obtain a read-out of the information stored therein.

The reversal of the register switch trigger 14 blocks further read-in of information to the triggers of register 10 and conditions the triggers of register 12 for receiving inputs by reason of the fact that the high potential on the line 54 conditions the AND circuit 58 whose other input is the information line 22. Pulses on the information line 22 are, therefore, gated through the AND circuit 58 by reason of the fact that the register switch trigger 14 has been reversed. Register 12 will then be filled during the time that register 10 is being read out. It is necessary that the read-out of register 10 be completed before the register 12 is filled, so that when the register 12 is filled, input control can be shifted back to the register 10.

A knowledge of the operation of the dual register system of Fig. 1 can be applied to the system of Fig. 3 in which the three registers are disclosed; these registers being respectively an A register 66, a B register 68 and a C register 70. Fig. 3 will illustrate how three registers can be used to provide for greater speed. It will be noted that three register switching triggers 72, 74 and 76 are employed to control read-in into registers 66, 68 and 70, respectively. When, for example, the register switching trigger 72 is in its On position, i.e., conducting on its left side, its output line 78 will be high and thereby permit entry of information into the register 66 by reason of the fact that it conditions an AND circuit 80. At the same time, output lines 82 and 84 of the register switching triggers 74 and 76, respectively, will be at low potential by reason of the fact that their respective triggers normally conduct on their right and are at this moment so conducting. It can be seen, therefore, that the AND circuits 86 and 88 are blocked.

It should be clear from a consideration of the system of Fig. 1 how the status of the trigger 72 of Fig. 3 will be reversed when the register 66 is filled and how the resultant negative shift on the output line 78 of the trigger 72 will cause the status of the trigger 74 to be reversed to permit use of the register 68. The trigger 74 will be turned back to its original status when the register 68 is filled, thus causing its output line 82 to drop in potential with the result that the trigger 76 to which said line is an input is reversed. The register 70 is now conditioned to receive information and when the register 70 is filled, the register switch trigger 76 will be reversed causing its output line 84 to drop in potential, thereby reversing the status of the register switching trigger 72 to which said line is connected. This then will again permit entry into the register 66.

The stepping of the bits through the triggers of the registers 66, 68 and 70 is accomplished in the same manner as that described in respect to Fig. 1, and the outputs of the fifteen-way AND circuits of Fig. 3 are utilized to read out their respective registers the same as described in respect to the AND circuit 62 of Fig. 1.

While the fundamentally novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claims.

What is claimed is:

1. In a deskewing device for magnetic tape reading mechanism adapted to read a multi-channel tape record having recorded thereon blocks of the same pre-determined number of multi-bit characters and in which each such blocks of characters is followed by a synchronizing bit in each recording channel, a plurality of data storage registers each having interconnected character bit storage positions equal to the number of characters in a block of characters recorded on such tape and being adapted to receive and register magnetic tape originated pulses in each of the positions thereof, a line for conveying magnetic tape originated pulses connected to the first bit storage position of each of said registers, means for gating magnetic tape originated pulses on said line into the first bit position of one of said registers and for blocking entry thereof into the other of said registers, means including said interconnections for shifting pulses through said registers by applying a sequence of shift pulses to the bit positions thereof, means for sensing when a synchronizing bit is shifted through said registers, and means responsive to said sensing means when the same has sensed a synchronizing bit for gating said tape originated pulses on said line into another of said registers.

2. In a deskewing device for magnetic tape reading mechanism adapted to read a multi-channel tape record having recorded thereon blocks of the same pre-determined number of multi-bit characters and in which each such block of characters is followed by a synchronizing bit in each recording channel, a plurality of data storage registers each having interconnected character bit storage positions equal to the number of characters in a block of characters recorded on such tape and being adapted to receive and register magnetic tape originated pulses in each of the positions thereof, a line for conveying magnetic tape originated pulses connected to the first bit storage position of each of said registers, means for gating magnetic tape originated pulses on said line into the first bt position of one of said registers and for blocking entry thereof into the other of said registers, means including said interconnections for shifting pulses through said registers by applying a sequence of shift pulses to the bit positions thereof, means for sensing when a synchronizing bit is shifted through said registers, means responsive to said sensing means when the same has sensed a synchronizing bit for gating said tape originated pulses on said line into another of said registers, and means also responsive to said last named means for reading-out said one register when the same is full.

3. In a deskewing device for magnetic tape reading mechanism adapted to read a multi-channel type record having recorded thereon blocks of the same pre-determined number of multi-bit characters and in which each such block of characters is followed by a synchronizing bit in each recording channel, a plurality of data storage registers each having interconnected character bit storage positions equal to the number of characters in a block of characters recorded on such tape and being adapted to receive and register magnetic tape originated pulses in each of the positions thereof, a line for conveying magnetic tape originated pulses connected to the first bit storage position of each of said registers, means for gating magnetic tape originated pulses on said line into the first bit position of one of said registers and for blocking entry thereof into the other of said registers, means including said interconnections for shifting pulses through said registers by applying a sequence of shift pulses to the bit positions thereof, means for sensing when a synchronizing bit is shifted through said registers, means responsive to said sensing means when the same has sensed a synchronizing bit for gating said tape originated pulses on said line into another of said registers, and means also responsive to said last named means for simultaneously reading-out the positions of said one register when the same is full.

4. In a deskewing device for magnetic tape reading mechanism adapted to read a multi-channel tape record having recorded thereon blocks of the same pre-determined number of multi-bit characters and in which each such block of characters is followed by a synchronizing bit in each recording channel, a pair of data storage registers each having interconnected character bit storage positions equal to the number of characters in a block of characters recorded on such tape and being adapted to receive and register magnetic tape originated pulses in each of the positions thereof, a line for conveying magnetic tape originated pulses connected to the first bit storage position of each of said registers, means for gating magnetic tape originated pulses on said line into the first bit position of one of said registers and for blocking entry thereof into the other of said registers, means including said interconnections for shifting pulses through said registers by applying a sequence of shift pulses to the bit positions thereof, means for sensing when a synchronizing bit is shifted through said registers, and means responsive to said sensing means when the same has sensed a synchronizing bit for gating said tape originated pulses on said line into the other of said registers.

5. In a deskewing device for magnetic tape reading mechanism adapted to read a multi-channel tape record having recorded thereon blocks of the same pre-determined number of multi-bit characters and in which each such block of characters is followed by a synchronizing bit in each recording channel, a pair of data storage registers each having interconnected character bit storage positions equal to the number of characters in a block of characters recorded on such tape and being adapted to receive and register magnetic tape originated pulses in each of the positions thereof, a line for conveying magnetic tape originated pulses for both of said registers, a bistable register control trigger, a separate coincidence circuit connected to each of said registers having as inputs thereto said line and the respective opposite outputs of said register control trigger, for gating magnetic tape originated pulses on said line into the first bit position of one of said registers and for blocking entry thereof into the other of said registers, means including said interconnections for shifting pulses through said registers by applying a sequence of shift pulses to the bit positions thereof, means for sensing when a synchronizing bit is shifted through said registers, and means responsive to said sensing means when the same has sensed a synchronizing bit for reversing the state of said register control trigger for gating said tape originated pulses on said line into the other of said registers.

6. In a deskewing device for magnetic tape reading mechanism adapted to read a multi-channel tape record having recorded thereon blocks of the same predetermined number of multi-bit characters and in which each such block of characters is followed by a synchronizing bit in each recording channel, a pair of data storage registers each having interconnected bistable triggers constituting character bit storage positions equal to the number of characters in a block of characters recorded on such tape and being adapted to receive and register magnetic tape originated pulses in each of the positions thereof, a line for conveying magnetic tape originated pulses, for both of said registers, a bistable register control trigger, a separate coincidence circuit connected to each of said registers having as inputs thereto said line and the respective opposite outputs of said register control trigger for gating magnetic tape originated pulses on said line into the first bit position of one of said registers and for blocking entry thereof into the other of said registers, means including said interconnections for shifting pulses through said registers by applying a sequence of shift pulses to the bit positions thereof, means for sensing when a synchronizing bit is shifted through said registers, and means responsive to said sensing means when the same has sensed a synchronizing bit for reversing the state of said register control trigger for gating said tape originated pulses on said line into the other of said registers.

7. In a deskewing device for magnetic tape reading mechanism adapted to read a multi-channel tape record having recorded thereon blocks of the same pre-determined number of multi-bit characters and in which each such block of characters is followed by a synchronizing bit in each recording channel, a pair of data storage registers each having interconnected bistable triggers constituting character bit storage positions equal to the number of characters in a block of characters recorded on such tape and being adapted to receive and register magnetic tape originated pulses in each of the positions thereof, a line for conveying magnetic tape originated pulses for both of said registers, a bistable register control trigger, a separate coincidence circuit connected to each of said registers having as inputs thereto said line and the respective opposite outputs of said register control trigger, means for gating magnetic tape originated pulses on said line into the first bit position of one of said registers and for blocking entry thereof into the other of said registers, means including said interconnections for shifting pulses through said registers by applying a sequence of shift pulses to the bit positions thereof, means for sensing when a synchronizing bit is shifted through said registers, means responsive to said sensing means when the same has sensed a synchronizing bit for reversing the state of said register control trigger for gating said tape originated pulses on said line into the other of said registers, and means also responsive to said last named means for reading-out the positions of said one register when the same is full.

References Cited in the file of this patent

UNITED STATES PATENTS

| | | |
|---|---|---|
| 2,636,672 | Hamilton | Apr. 28, 1953 |
| 2,850,234 | Bartelt et al. | Sept. 2, 1958 |

UNITED STATES PATENT OFFICE

CERTIFICATION OF CORRECTION

Patent No. 2,970,300 January 31, 1961

Victor R. Witt et al.

It is hereby certified that error appears in the above numbered patent requiring correction and that the said Letters Patent should read as corrected below.

Column 2, line 7, strike out "of", second occurrence; column 4, line 23, for "is" read -- its --; column 5, line 70, for "blocks" read -- block --; column 6, line 28, for "bt" read -- bit --.

Signed and sealed this 11th day of July 1961.

(SEAL)
Attest:

ERNEST W. SWIDER
Attesting Officer

DAVID L. LADD
Commissioner of Patents